(12) United States Patent
Chi et al.

(10) Patent No.: US 10,749,227 B2
(45) Date of Patent: Aug. 18, 2020

(54) HEAT DISSIPATION MATERIAL, METHOD OF MANUFACTURING THE SAME, AND BATTERY MODULE INCLUDING THE HEAT DISSIPATION MATERIAL

(71) Applicant: LG Chem, Ltd., Seoul (KR)

(72) Inventors: Ho-June Chi, Daejeon (KR); Byoung-Cheon Jeong, Daejeon (KR); Jeong-O Mun, Daejeon (KR)

(73) Assignee: LG Chem, Ltd. (KR)

( * ) Notice: Subject to any disclaimer, the term of this patent is extended or adjusted under 35 U.S.C. 154(b) by 81 days.

(21) Appl. No.: 16/062,991

(22) PCT Filed: Jun. 8, 2017

(86) PCT No.: PCT/KR2017/005972
§ 371 (c)(1),
(2) Date: Jun. 15, 2018

(87) PCT Pub. No.: WO2018/038361
PCT Pub. Date: Mar. 1, 2018

(65) Prior Publication Data
US 2018/0366795 A1      Dec. 20, 2018

(30) Foreign Application Priority Data
Aug. 26, 2016   (KR) .................. 10-2016-0109273

(51) Int. Cl.
*H01M 10/60* (2014.01)
*H01M 10/653* (2014.01)
(Continued)

(52) U.S. Cl.
CPC ....... *H01M 10/653* (2015.04); *H01M 10/613* (2015.04); *H01M 10/6551* (2015.04); *H01M 10/6554* (2015.04)

(58) Field of Classification Search
None
See application file for complete search history.

(56) References Cited

U.S. PATENT DOCUMENTS

| | | | |
|---|---|---|---|
| 6,097,598 A | 8/2000 | Miyahara et al. | |
| 2009/0185354 A1 | 7/2009 | Lee et al. | |

(Continued)

FOREIGN PATENT DOCUMENTS

| | | |
|---|---|---|
| DE | 202013001662 U1 | 3/2013 |
| JP | H10242354 A | 9/1998 |

(Continued)

OTHER PUBLICATIONS https://www.merriam-webster.com/dictionary/buffer#other-words (Year: 2014).*

(Continued)

*Primary Examiner* — Lucas J. O'Donnell
(74) *Attorney, Agent, or Firm* — Lerner, David, Littenberg, Krumholz & Mentlik, LLP (57) ABSTRACT

Provided are a heat dissipation material, a method of manufacturing the same, and a battery module including the same. The heat dissipation material according to an embodiment of the present disclosure may include: a plurality of foam pad members provided to be capable of buffering; and a graphite member configured to surround the foam pad member for heat conduction, wherein the graphite member is provided to surround the plurality of foam pad members, respectively.

9 Claims, 6 Drawing Sheets

(51) Int. Cl.
*H01M 10/6551* (2014.01)
*H01M 10/6554* (2014.01)
*H01M 10/613* (2014.01)

(56) References Cited

U.S. PATENT DOCUMENTS

| | | | | |
|---|---|---|---|---|
| 2011/0048963 A1* | 3/2011 | Shimizu | ............... | B24B 37/046 |
| | | | | 205/640 |
| 2012/0318484 A1 | 12/2012 | Hirasawa | | |
| 2013/0216887 A1 | 8/2013 | Wayne et al. | | |
| 2014/0116661 A1 | 5/2014 | Xu et al. | | |
| 2016/0004284 A1* | 1/2016 | Cohen | ...................... | G06F 1/20 |
| | | | | 361/679.54 |

FOREIGN PATENT DOCUMENTS

| | | | |
|---|---|---|---|
| JP | 2005310449 | A | 11/2005 |
| JP | 2013004783 | A | 1/2013 |
| KR | 20090079449 | | 7/2009 |
| KR | 101243647 | B1 | 3/2013 |
| KR | 20140125992 | A | 10/2014 |
| KR | 101486369 | B1 | 1/2015 |
| WO | 2012044934 | A1 | 4/2012 |
| WO | 2016131141 | A1 | 8/2016 |

OTHER PUBLICATIONS

Supplementary European Search Report for EP17843781 dated Feb. 28, 2019.
Search report from International Application No. PCT/KR2017/005972, dated Sep. 28, 2017.

* cited by examiner

HEAT DISSIPATION MATERIAL, METHOD OF MANUFACTURING THE SAME, AND BATTERY MODULE INCLUDING THE HEAT DISSIPATION MATERIAL

CROSS-REFERENCE TO RELATED APPLICATIONS

The present application is a national phase entry under 35 U.S.C. § 371 of International Application No. PCT/KR2017/005972, filed Jun. 8, 2017, which claims priority from Korean Patent Application No. 10-2016-0109273, filed on Aug. 26, 2016, the disclosures of which are incorporated herein by reference.

TECHNICAL FIELD

The present disclosure relates to a heat dissipation material, a method of manufacturing the heat dissipation material, and a battery module including the heat dissipation material, and more particularly, to a heat dissipation material capable of improving heat transfer efficiency, a method of manufacturing the heat dissipation material, and a battery module including the heat dissipation material.

BACKGROUND ART

As technology development and demand for mobile devices have increased, demand for secondary batteries as an energy source has rapidly increased. Conventionally, nickel-cadmium batteries or hydrogen ion batteries have been used as secondary batteries. However, lithium secondary batteries which are free from charging and discharging due to little memory effect compared with nickel-based secondary batteries have recently widely used, and have a low self-discharge rate and a high energy density.

Such a lithium secondary battery mainly uses a lithium oxide and a carbonaceous material as a positive electrode active material and a negative electrode active material, respectively. The lithium secondary battery includes an electrode assembly in which a positive electrode plate and a negative electrode plate each coated with such a positive electrode active material and a negative electrode active material are arranged with a separator therebetween, and an outer material, that is, a battery case, for sealing and storing the electrode assembly together with an electrolyte solution.

The lithium secondary battery includes a positive electrode, a negative electrode, the separator therebetween, and an electrolyte. Depending on which one of the positive electrode active material and the negative electrode active material is used, the lithium secondary battery may be divided into a lithium ion battery (LIB), a polymer lithium ion battery (PLIB), and so on. Generally, electrodes of these lithium secondary batteries are formed by applying the positive electrode active material or the negative electrode active material to a current collector such as a sheet, a mesh, a film, and a foil of aluminum or cupper, and by drying it thereafter.

In addition, although one battery cell can be used alone in the secondary battery, a plurality of battery cells may be used in series and/or in parallel with each other. When the plurality of battery cells are connected in series and/or in parallel, heat is generated, and it is necessary to discharge such heat to the outside.

Conventionally, a thermal interface material (TIM) for transferring heat by contacting the battery cell has been used, but a conventional TIM has a problem in that thermal conductivity is not high.

DISCLOSURE

Technical Problem

The present disclosure is designed to solve the problems of the related art, and therefore the present disclosure is directed to providing a heat dissipation material having relatively improved heat transfer efficiency, a method of manufacturing the heat dissipation material, and a battery module including the heat dissipation material.

In addition, the present disclosure is directed to providing a heat dissipation material capable of maintaining tightness during contact, a method of manufacturing the heat dissipation material, and a battery module including the heat dissipation material.

In addition, the present disclosure is directed to providing a heat dissipation material allowing a simple and easy operation, a method of manufacturing the heat dissipation material, and a battery module including the heat dissipation material.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a heat dissipation material including: a plurality of foam pad members provided to be capable of buffering; and a graphite member configured to surround the foam pad member for heat conduction, wherein the graphite member is provided to surround the plurality of foam pad members, respectively.

In addition, the graphite member may be provided to surround a pair of foam pad members, respectively, so that one of both side ends of the graphite member surrounds any one of the pair of foam pad members, and the other of both side ends of the graphite member surround the other one of the pair of foam pad members.

In addition, the pair of foam pad members may be spaced apart from each other.

In addition, both side ends of the graphite member may surround the foam pad member in the same direction with respect to a virtual horizontal line, respectively, or surround the foam pad member in opposite directions with respect to the virtual horizontal line, respectively.

In another aspect of the present disclosure, there is also provided a method of manufacturing a heat dissipation material, including: providing a plurality of foam pad members capable of buffering; providing a graphite member for heat conduction to surround the plurality of foam pad members, respectively; and pressing a certain portion of the graphite member to surround the plurality of foam pad members to thermally compress the same.

In addition, in another aspect of the present disclosure, there is also provided a method of manufacturing a heat dissipation material, the method including: (a) providing a pair of foam pad members capable of buffering; and (b) providing a graphite member for heat conduction so that both side ends of the graphite member surround the pair of foam pad members, respectively.

In addition, the operation (b) may include providing the graphite member so that both side ends of the graphite member surround the foam pad members in the same direction with respect to a virtual horizontal line, respectively, or surround the foam pad members in opposite directions with respect to the virtual horizontal line, respectively.

In another aspect of the present disclosure, there is also provided a battery module including: a battery cell; a heat dissipation plate configured to dissipate heat of the battery cell; and a heat dissipation material interposed between the battery cell and the heat dissipation plate.

Advantageous Effects

In the embodiments of the present disclosure, since the graphite member is provided to surround a plurality of foam pad members, a heat conduction path may increase and thus, thermal conductivity may be relatively improved.

In addition, since a foam pad member capable of buffering is used, tightness may be maintained during contact.

In addition, since a heat dissipation material is combined in an attachment type, a simple and easy work may be possible.

BEST MODE

Hereinafter, preferred embodiments of the present disclosure will be described in detail with reference to the accompanying drawings.

Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Hereinafter, a heat dissipation material, a method of manufacturing the heat dissipation material, and a battery module including the heat dissipation material according to embodiments of the present disclosure will be described in detail with reference to the accompanying drawings. In the drawings, the size of each element or a specific portion constituting the element is exaggerated, omitted, or schematically shown for convenience and clarity of description. Thus, the size of each component may not entirely reflect the actual size. In the case where it is judged that the detailed description of the related known functions or constructions may unnecessarily obscure the gist of the present disclosure, such explanation will be omitted.

The term, 'combine' or 'connect' as used in the specification, may refer not only to a case where one member and another member are directly combined or directly connected but also a case where one member is indirectly combined to another member via a connecting member or indirectly connected.

The heat dissipation material in the specification may be used to release heat generated from various objects such as electronic parts and products using electronic circuits. However, for convenience of description, the heat dissipation material of the present embodiment will be mainly described in a case of using the heat dissipation material in a battery module. However, it should be noted that the use range of the heat dissipation material is not limited to the battery module.

Figure 1:
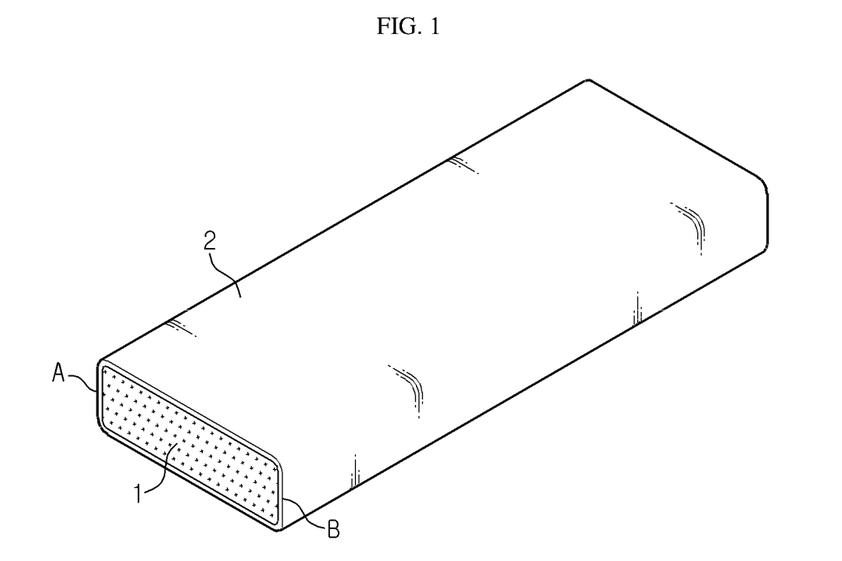
FIG. 1 is a schematic perspective view of a general heat transfer material.
Figure 2:
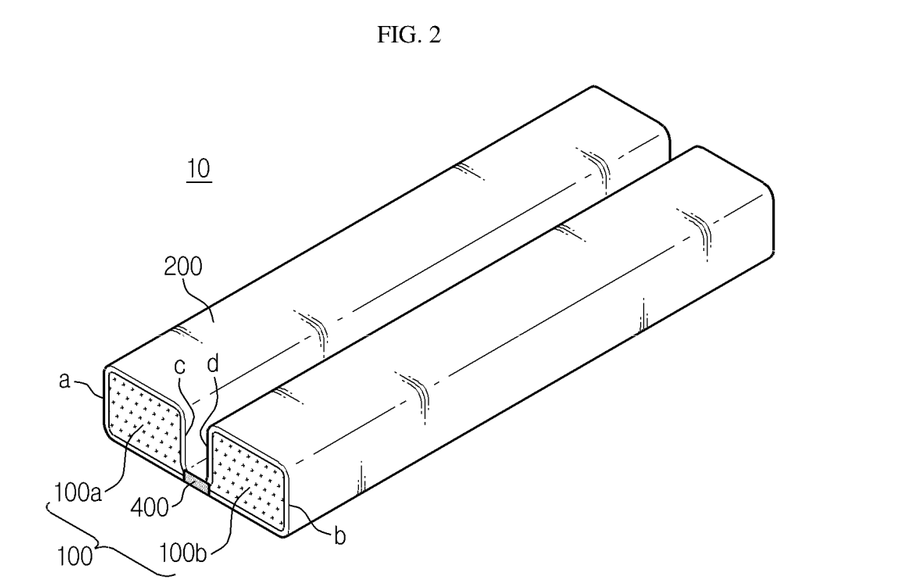
FIG. 2 is a schematic perspective view of a heat transfer material according to an embodiment of the present disclosure.
Figure 3:
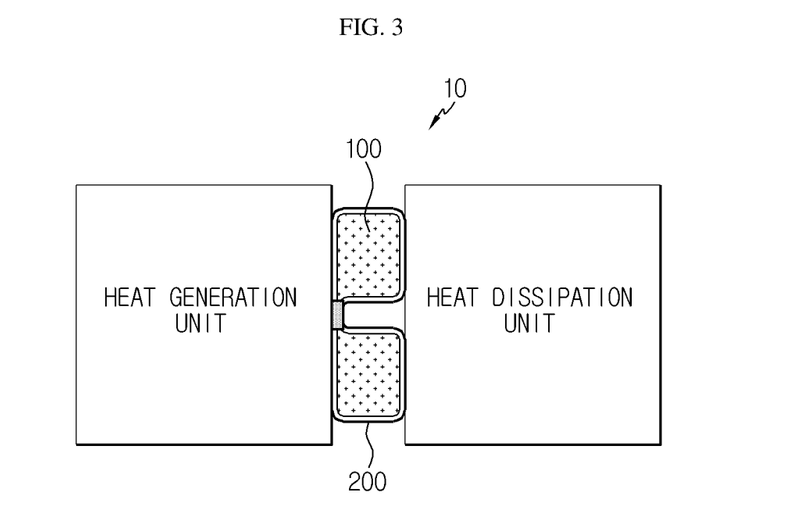
FIG. 3 is a schematic view illustrating a heat dissipation material according to an embodiment of the present disclosure being arranged between heat generating units.
Figure 4:
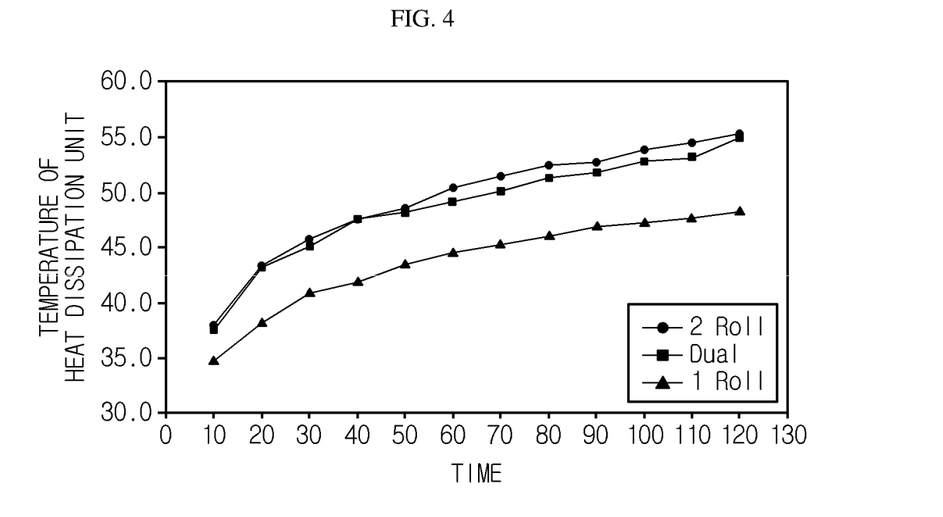
FIG. 4 is an experiment graph showing a temperature change of a heat dissipation unit according to an embodiment of the present disclosure.

FIG. 1 is a schematic perspective view of a general heat transfer material, FIG. 2 is a schematic perspective view of a heat transfer material 10 according to an embodiment of the present disclosure, FIG. 3 is a schematic view illustrating a heat dissipation material 10 according to an embodiment of the present disclosure being arranged between heat generating units, and FIG. 4 is an experiment graph showing a temperature change of a heat dissipation unit according to an embodiment of the present disclosure.

Referring to FIG. 1, the conventional heat transfer material may be formed by bonding a thermally conductive material 2 to a center material 1. However, the heat transfer material of FIG. 1 may have only two paths A and B through which heat can be transferred, which may cause a problem of relatively low heat transfer efficiency. However, the heat dissipation material 10 according to an embodiment of the present disclosure may have more than two paths through which heat can be transferred and thus, heat transfer efficiency may be improved in comparison with the conventional heat transfer materials. Hereinafter, this configuration will be described in detail.

Referring to FIG. 2, the heat dissipation material 10 according to an embodiment of the present disclosure may include a foam pad member 100 and a graphite member 200.

The foam pad member 100 may be provided for buffering and have an elastic property. For example, when the graphite member 200 surrounds the foam pad member 100, the foam pad member 100 may buffer the graphite member 200 from an external force. In addition, the foam pad member 100 may improve or maintain contact tightness. In other words, for example, when the heat dissipation material 10 of the present embodiment is used for a battery module, the heat dissipation material 10 may be arranged between a battery cell 600 (refer to FIG. 8) and a heat dissipation plate 700 (refer to FIG. 8). In this case, the foam pad member 100 may allow the graphite member 200 to be in close contact with both the battery cell 600 and the heat dissipation plate 700. For this purpose, the foam pad member 100 may include polyurethane, but is not limited thereto. As long as the buffering and the contact tightness of the graphite member 200 are improved as described above, various materials, particularly, various composite materials may be used.

The graphite member 200 may be configured to surround the foam pad member 100 for heat conduction. Here, the graphite member 200 may be configured to surround each of the plurality of foam pad members 100, and a manner may vary in which the graphite member 200 surrounds the plurality of foam pad members 100. In addition, the graphite member 200 may be configured to surround a pair of the foam pad members 100*a* and 100*b* in FIG. 2, but the number of the foam pad members 100 may vary. In other words, the number of the foam pad members 100 may be three, four, or more. However, for convenience of explanation, a case of the pair of foam pad members 100 will be described. When the foam pad member 100 is provided in a pair, the graphite member 200 may be provided to surround each of the pair of foam pad members 100*a* and 100*b*, and one end of both side ends of the graphite member 200 may surround one of the pair of foam pad members 100*a* and 100*b*, and the other end of the both side ends of the graphite member 200 may surround the other of the pair of foam pad members 100*a* and 100*b*. Here, both side ends of the graphite member 200 may be attached to each other or may be separated from each other. As will be described later, both side ends of the graphite member 200 may be attached to each other in a configuration in which one graphite member 200 surrounds the pair of foam pad members 100*a* and 100*b* and then, a center portion thereof is thermally compressed. In addition, when one graphite member 200 surrounds each of the pair of foam pad members 100*a* and 100*b*, the pair of foam pad members 100*a* and 100*b* may be spaced apart from each other. Referring to FIG. 2, the heat dissipation material 10 according to an embodiment of the present disclosure may have four paths a, b, c, and d through which heat can be transferred. Thus, it may be possible to perform twice as much heat transfer at the same time as compared with the conventional heat transfer material of FIG. 1 having two paths for the heat transfer. If a case is considered where one graphite member 200 surrounds each of three foam pad members 100, then the number of paths through which heat can be transferred may be six and there may be three times as much heat transfer at the same time as compared with the conventional heat transfer material of FIG. 1. In this regard, referring to FIG. 3, the heat dissipation material 10 according to an embodiment of the present disclosure may be arranged between a heat generation unit and a heat dissipation unit. Here, the heat generation unit may be various units or devices which generate heat, including the battery module. Referring to FIG. 4, there is shown a graph of an experimental result of a change in temperature of the heat dissipation unit per unit time under the conditions shown in FIG. 3, and a high temperature of the heat dissipation unit may indicate that high heat transfer is performed through the heat dissipation material. In FIG. 4, 1 Roll is the conventional heat transfer material, 2 Rolls is the heat dissipation material 10 according to an embodiment of the present disclosure, and Dual is a case where two conventional heat transfer materials of FIG. 1 are provided. Referring to FIG. 4, the heat dissipation material 10 according to an embodiment of the present disclosure shows a higher temperature of the heat dissipation unit at the same time as compared with the conventional heat transfer material of FIG. 1. Thus, it can be understood that the heat transfer is performed more effectively and accordingly, a high heat dissipation effect is obtained in the heat dissipation material 10. The heat dissipation material 10 according to an embodiment of the present invention disclosure shows a similar or slightly higher heat dissipation effect as compared with the case where two conventional heat transfer materials of FIG. 1 are used. In other words, it can be seen that the heat dissipation material 10 according to an embodiment of the present disclosure has significantly improved heat dissipation effect as compared with the conventional heat transfer material of FIG. 1. In addition, it can be seen that the heat dissipation material 10 according to an embodiment of the present disclosure shows, by using a small area and/or less cost, a similar or slightly higher heat dissipation effect as compared with the case where two conventional heat transfer materials of FIG. 1 are used.

Each of the both side ends of the graphite member 200 may be provided to surround the foam pad member 100 in the same or an opposite direction with respect to the virtual horizontal line. As will be described later, referring to FIG. 6B, each end of the both side ends 210 and 220 of the graphite member 200 may be provided so as to surround each of the pair of foam pad members 100*a* and 100*b* in a clockwise direction and a counterclockwise direction, respectively. Alternatively, referring to FIG. 7B, each end of the both side ends 210 and 220 of the graphite member 200 may be provided so as to surround all of the pair of foam pad members 100*a* and 100*b* in a counterclockwise direction. Of course, each end of the both side ends 210 and 220 of the graphite member 200 may be provided so as to surround all of the pair of the foam pad members 100*a* and 100*b* in a clockwise direction.

Hereinafter, an operation and effects of the heat dissipation material 10 according to the embodiment of the present disclosure will be described.

Referring to FIG. 2, the heat dissipation material 10 according to an embodiment of the present disclosure may be provided with the graphite member 200 surrounding, for example, a pair of foam pad members 100*a* and 100*b*. Then, a heat transfer path of the heat dissipation material 10 may increase as compared with the conventional heat transfer material. Thus, referring to FIG. 4, it can be identified that the heat transfer effect is improved. Here, the heat dissipation material 10 of the present embodiment may be configured so that the graphite member 200 surrounds the plurality of foam pad members 100 by various methods, and the various methods will be described below.

Figure 5:
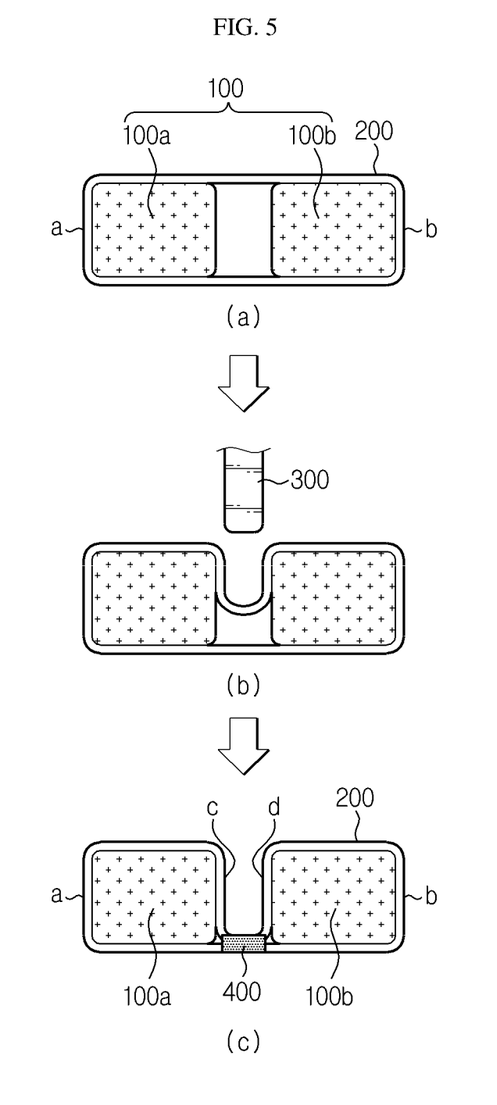
FIG. 5 illustrates a process of manufacturing a heat dissipation material according to a first embodiment of the present disclosure.

FIG. 5 illustrates a process of manufacturing the heat dissipation material 10 according to a first embodiment of the present disclosure. Hereinafter, a method of manufacturing the heat dissipation material 10 according to the first embodiment of the present disclosure will be described.

Firstly, referring to FIG. 5A, the graphite member 200 capable of conducting heat may surround a pair of foam pad members 100*a* and 100*b* capable of buffering. Next, when the graphite member 200 surrounds the pair of foam pad members 100*a* and 100*b*, a thermo-compression unit 300 may thermally compress a certain portion of the graphite member 200, for example, a center portion thereof, as illustrated in FIG. 5B. Here, the thermo-compression unit 300 may be variously provided, and may be, for example, a thermo-compression press. However, the embodiment is not limited thereto.

Next, when a thermo-compressed portion is attached via a thermo-bonding tape 400 as illustrated in FIG. 5C, the graphite member 200 may be configured to surround each of the pair of foam pad members 100a and 100b. In this manner, the heat dissipation material 10 in which one graphite member 200 surrounds the pair of foam pad members 100a and 100b may be manufactured. Here, after one graphite member 200 surrounds the pair of foam pad members 100a and 100b, a cross-sectional shape of the pair of foam pad members 100a and 100b may be formed into various shapes such as a square shape, a triangle shape, a circular shape, and an elliptical shape.

Figure 6:
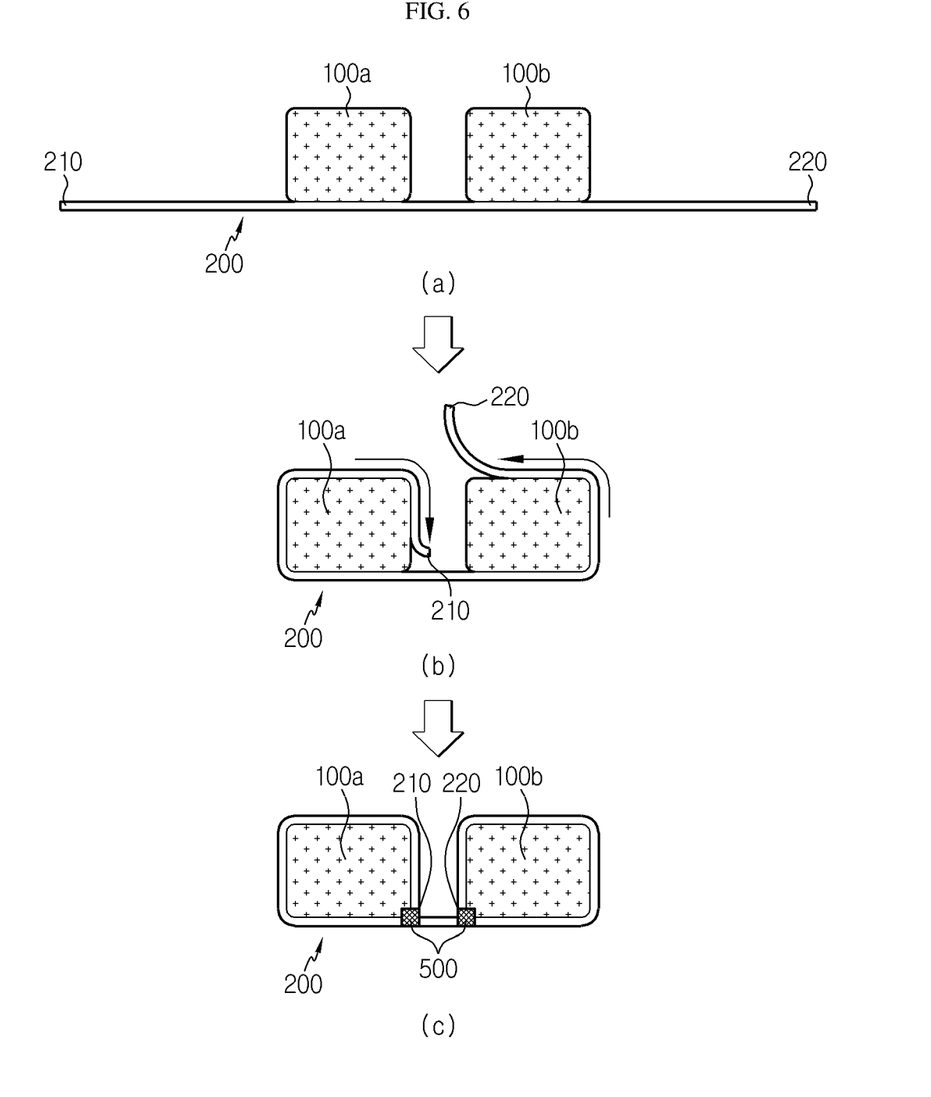
FIG. 6 illustrates a process of manufacturing a heat dissipation material according to a second embodiment of the present disclosure.

FIG. 6 illustrates a process of manufacturing the heat dissipation material 10 according to a second embodiment of the present disclosure. Hereinafter, a method of manufacturing the heat dissipation material 10 according to a second embodiment of the present disclosure will be described.

Firstly, referring to FIG. 6A, a pair of foam pad members 100a and 100b capable of buffering may be placed, for example, on a top side of the graphite member 200, in a state in which the graphite member 200 capable of thermal conduction is spread. Next, referring to FIG. 6B, each end of both side ends 210 and 220 of the graphite member 200 may surround each of the pair of foam pad members 100 in opposite directions to each other with respect to a virtual horizontal line, that is, each end of the both side ends 210 and 220 may surround each of the pair of foam pad members 100 in a clockwise direction and a counterclockwise direction, respectively. Next, as illustrated in FIG. 6C, each end of the both side ends 210 and 220 of the graphite member 200 may be adhered to the graphite member 200 by using an adhesive tape 500 that are generally used for various purposes. In this manner, the heat dissipation material 10 in which one graphite member 200 surrounds the pair of foam pad members 100a and 100b may be manufactured.

Figure 7:
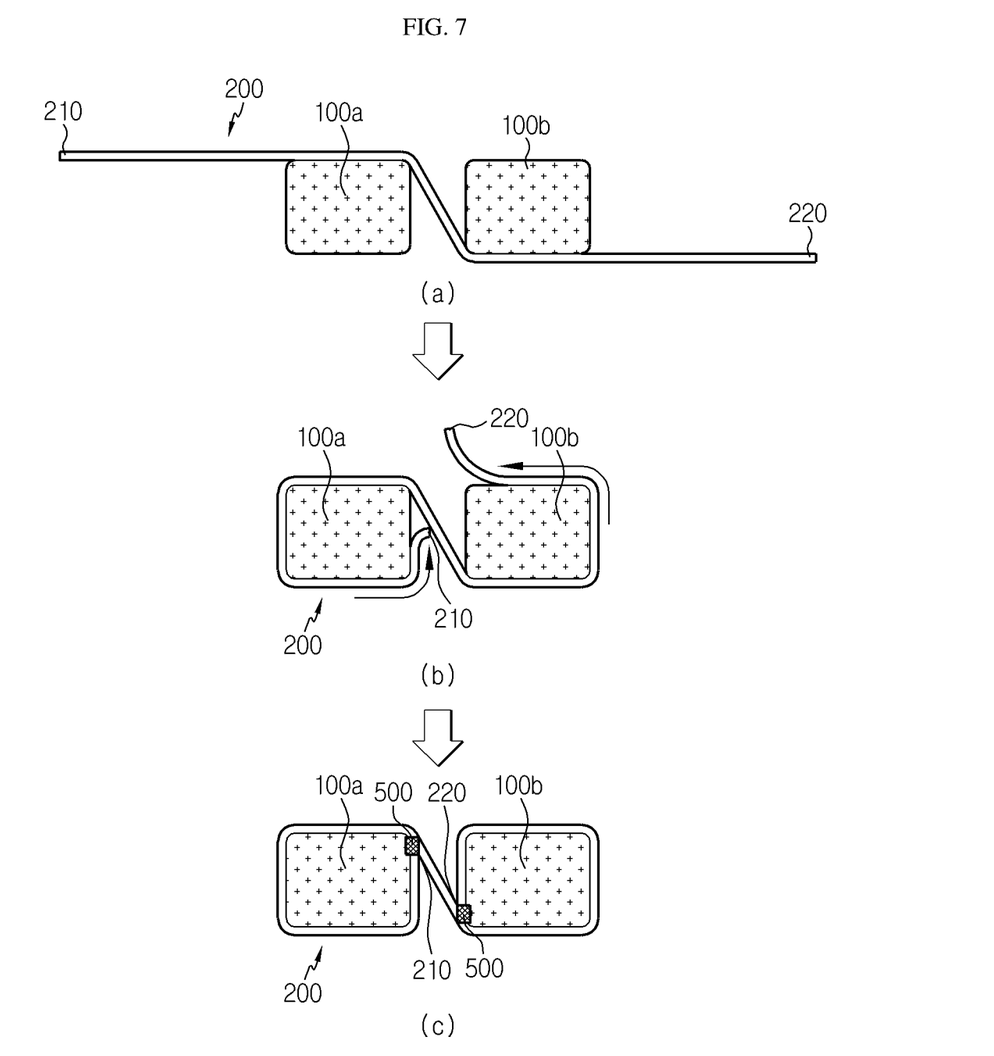
FIG. 7 illustrates a process of manufacturing a heat dissipation material according to a third embodiment of the present disclosure.

FIG. 7 illustrates a process of manufacturing the heat dissipation material 10 according to a third embodiment of the present disclosure. Hereinafter, a method of manufacturing the heat dissipation material 10 according to a third embodiment of the present disclosure will be described.

Firstly, referring to FIG. 7A, one (100b) of a pair of foam pad members 100a and 100b capable of buffering may be placed, for example, on a top side of the graphite member 200 and the other (100a) of the pair of foam pad members 100a and 100b may be placed, for example, on a bottom side of the graphite member 200, in a state in which the graphite member 200 capable of thermal conduction is spread. Next, referring to FIG. 7B, each end of the both side ends 210 and 220 of the graphite member 200 may surround each of the pair of foam pad members 100 in the same direction with respect to a virtual horizontal line, that is, either all in a clockwise direction or all in a counterclockwise direction. Next, as illustrated in FIG. 7C, each end of the both side ends 210 and 220 of the graphite member 200 may be adhered to the graphite member 200 by using the adhesive tape 500. In this manner, the heat dissipation material 10 in which one graphite member 200 surrounds the pair of foam pad members 100a and 100b may be manufactured.

Figure 8:
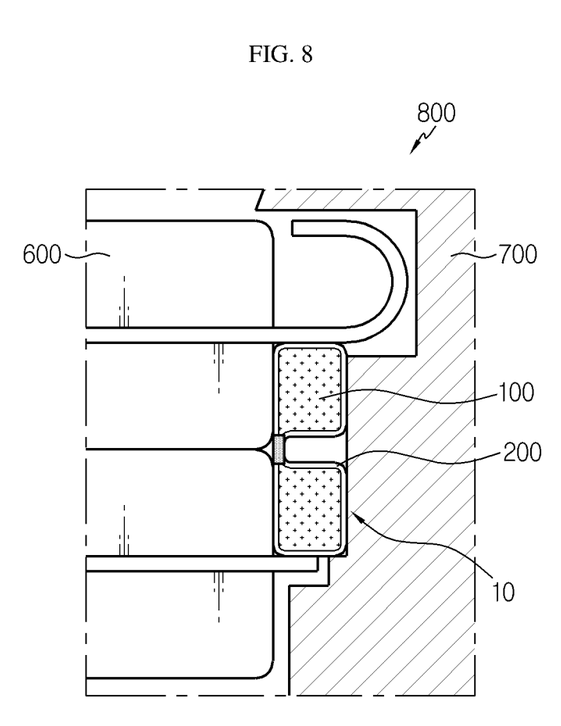
FIG. 8 is a partial cross-sectional view of a battery module including a heat dissipation material according to an embodiment of the present invention.

FIG. 8 is a partial cross-sectional view of a battery module 800 including a heat dissipation material 10 according to an embodiment of the present disclosure. Hereinafter, the battery module 800 including the heat dissipation material 10 according to an embodiment of the present disclosure will be described. However, descriptions of the above-described heat dissipation material 10 will be omitted, which is in common to the previous embodiments.

A battery cell 600 may include a positive electrode, a separator, a negative electrode, an active material, and an electrolytic solution, and may have a structure capable of being charged and discharged by an electrochemical reaction between components. The battery cell 600 may be received in a cartridge (not illustrated), and when a plurality of battery cells 600 are respectively received in a plurality of cartridges (not illustrated), a cartridge assembly (not illustrated) including the plurality of cartridges stacked on each other may be provided. Since the battery cell 600 can generate heat, it is necessary to dissipate such heat. For this purpose, a heat dissipation plate 700 may be provided, and the heat dissipation material 10 according to an embodiment of the present disclosure may be arranged between the battery cell 600 and the heat dissipation plate 700 to transfer heat generated from the battery cell 600 to the heat dissipation plate 700. Here, heat conduction efficiency may be improved because the heat dissipation material 10 of the present embodiment contacts both the battery cell 600 and the heat dissipation plate 700 while maintaining contact tightness between the battery cell 600 and the heat dissipation plate 700. In addition, since the heat dissipation material 10 can be combined in an attachment type between the battery cell 600 and the heat dissipation plate 700, a simple and easy operation may be possible, and there may be an advantage of simple removal and simple rework in case a problem or damage occurs during a manufacturing process. As described above, since the heat dissipation material 10 according to the present embodiment may have a higher heat transfer efficiency than the conventional heat transfer materials, there may be an effect that heat of the battery module 800 is dissipated in a short time and heat damage of the battery module 800 is prevented.

INDUSTRIAL APPLICABILITY

The present disclosure relates to a heat dissipation material, a method of manufacturing the same, and a battery module including the same, and more particularly, to an industry related to a secondary battery.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A heat dissipation material comprising:
    a plurality of foam pad members; and
    a graphite member configured to surround the plurality of foam pad members, respectively, for heat conduction,
    wherein side ends of the graphite member are attached to each other, and
    wherein a portion of the graphite member is thermally compressed between two of the plurality of foam members.

2. The heat dissipation material of claim 1, wherein the plurality of foam pad members are spaced apart from each other.

3. A method of manufacturing a heat dissipation material, the method comprising:
    providing a plurality of foam pad members;
    providing a graphite member for heat conduction to surround the plurality of foam pad members, respectively, wherein side ends of the graphite member are attached to each other; and
    pressing a portion of the graphite member to thermally compress the portion between two of the plurality of foam members.

4. A battery module comprising:
a battery cell;
a heat dissipation plate configured to dissipate heat of the battery cell; and
a heat dissipation material of claim 1, interposed between the battery cell and the heat dissipation plate.

5. The heat dissipation material of claim 1, wherein the plurality of foam pad members includes three or more foam pad members.

6. The heat dissipation material of claim 1, further comprising a thermo-bonding tape attached to the thermally compressed portion of the graphite member.

7. The method of manufacturing the heat dissipation material of claim 3, further comprising attaching a thermo-bonding tape to the thermally compressed portion of the graphite member.

8. The heat dissipation material of claim 1, wherein a cross-sectional shape of each of the plurality of foam pad members is a square shape or a triangle shape.

9. The method of manufacturing the heat dissipation material of claim 3, further comprising forming a cross-sectional shape of each of the plurality of foam pad members into a square shape or a triangle shape.

* * * * *